United States Patent [19]
Kadosumi et al.

[11] Patent Number: 5,761,737
[45] Date of Patent: Jun. 2, 1998

[54] DATA DRIVEN TYPE INFORMATION PROCESSING APPARATUS HAVING IMPROVED GENERATION NUMBER TRANSLATION

[75] Inventors: Ryuji Kadosumi; Tsuyoshi Muramatsu, both of Tenri, Japan

[73] Assignee: Sharp Kabushiki Kaisha, Osaka, Japan

[21] Appl. No.: 412,303

[22] Filed: Mar. 29, 1995

[30] Foreign Application Priority Data

Mar. 30, 1994 [JP] Japan .................................. 6-060509

[51] Int. Cl.$^6$ ........................................... G06F 13/12
[52] U.S. Cl. .......................... 711/169; 711/202; 711/163
[58] Field of Search .......................... 395/375, 496, 395/490, 412, 427, 415, 166, 137, 138; 348/578; 711/169, 163

[56] References Cited

U.S. PATENT DOCUMENTS

| | | | |
|---|---|---|---|
| 5,227,863 | 7/1993 | Bilbrey et al. | 348/578 |
| 5,502,834 | 3/1996 | Arata et al. | 395/496 |
| 5,526,502 | 6/1996 | Yoshida et al. | 395/412 |
| 5,533,185 | 7/1996 | Lentz et al. | 395/162 |

OTHER PUBLICATIONS

Photocopy of "Specification of Pictorial Data Driven Type Language UL1" Akechi Mitsuo et al, Proceedings of 32nd National Conference of the Institute of Information Proceeding Engineers (former half of 1986) pp. 209–210, 1986.

*Primary Examiner*—Parshotam S. Lall
*Assistant Examiner*—Gautam R. Patel

[57] ABSTRACT

A data driven type information processing apparatus includes a generation number translation table and a generation number translation circuit. The generation number translation table includes translated generation numbers. The translated generation numbers have been calculated in advance in relation to the generation numbers by a prescribed functional relation. An address of the translated generation number is specified by a prescribed calculation on the generation number. In response to a generation number translation instruction, the generation number translation circuit accesses the generation number translation table based on the content of the generation number field of the applied data packet, and reads the corresponding translated generation number. Further, the generation number translation circuit rewrites the generation number of the applied data packet with the read translated generation number. The generation number can be translated easily with fewer number of instructions, in accordance with a prescribed functional relation. The translated generation number can be prepared in advance with a desired precision. As a result, a data driven type information processing apparatus by which generation number can be translated easily at high speed with high precision can be obtained.

20 Claims, 22 Drawing Sheets

FIG. 8   PRIOR ART

INPUT = NODE 1 INPUT

| GENERATION NUMBER | DATA |
|---|---|
| 6A79FF | 555 |

FIG. 9   PRIOR ART

NODE 1 OUTPUT、NODE 2、3 INPUT

| GENERATION NUMBER | DATA |
|---|---|
| 6A79FF | 555 |

FIG. 10   PRIOR ART

NODE 2 OUTPUT、NODE 4 INPUT、NODE 9 LEFT INPUT

| GENERATION NUMBER | DATA |
|---|---|
| 6A79FF | 555 |

FIG. 11   PRIOR ART

NODE 3 OUTPUT、NODE 5 INPUT

| GENERATION NUMBER | DATA |
|---|---|
| 6A79FF | 9FF |

FIG. 12   PRIOR ART

NODE 4 OUTPUT、NODE 6 INPUT

| GENERATION NUMBER | DATA |
|---|---|
| 6A79FF | 9FF |

FIG.13   PRIOR ART

NODE 5 OUTPUT、NODE 7 INPUT

| GENERATION NUMBER | DATA |
|---|---|
| 6A79FF | CA3 |

FIG.14   PRIOR ART

NODE 6 OUTPUT、NODE 8 LEFT INPUT

| GENERATION NUMBER | DATA |
|---|---|
| 6A79FF | 800 |

FIG.15   PRIOR ART

NODE 7 OUTPUT、NODE 8 RIGHT INPUT

| GENERATION NUMBER | DATA |
|---|---|
| 6A79FF | 0A3 |

FIG.16   PRIOR ART

NODE 8 OUTPUT、NODE 9 RIGHT INPUT

| GENERATION NUMBER | DATA |
|---|---|
| 6A79FF | 8A3 |

FIG.17   PRIOR ART

NODE 9 OUTPUT、OUTPUT

| GENERATION NUMBER | DATA |
|---|---|
| 6A78A3 | 555 |

FIG. 21 PRIOR ART
INPUT=NODE 1, 2 INPUT, NODE 5 LEFT INPUT

| GENERATION NUMBER | DATA |
|---|---|
| 5FFDFF | 9 |

FIG. 22 PRIOR ART
NODE 1 OUTPUT, NODE 3 INPUT

| GENERATION NUMBER | DATA |
|---|---|
| 5FFDFF | 7FF |

FIG. 23 PRIOR ART
NODE 3 OUTPUT, NODE 5 RIGHT INPUT

| GENERATION NUMBER | DATA |
|---|---|
| 5FFDFF | 3FF |

FIG. 24 PRIOR ART
NODE 2 OUTPUT, NODE 4 INPUT

| GENERATION NUMBER | DATA |
|---|---|
| 5FFDFF | DFF |

FIG. 25 PRIOR ART
NODE 4 OUTPUT, NODE 7 RIGHT INPUT

| GENERATION NUMBER | DATA |
|---|---|
| 5FFDFF | 1FF |

FIG.26  PRIOR ART
NODE 1 OUTPUT、NODE 3 INPUT

| GENERATION NUMBER | DATA |
|---|---|
| 5FFDFE | 9 |

FIG.27  PRIOR ART
NODE 6 OUTPUT、NODE 7 LEFT INPUT

| GENERATION NUMBER | DATA |
|---|---|
| 5FFE00 | 9 |

FIG.28  PRIOR ART
NODE 7 OUTPUT、NODE 8 INPUT

| GENERATION NUMBER | DATA |
|---|---|
| 580200 | 9 |

FIG.29  PRIOR ART
NODE 8 OUTPUT、NODE 9 INPUT

| GENERATION NUMBER | DATA |
|---|---|
| 5801A0 | 9 |

FIG.30  PRIOR ART
NODE 9 OUTPUT、NODE 10 INPUT

| GENERATION NUMBER | DATA |
|---|---|
| 5681A0 | 9 |

FIG.31 PRIOR ART

NODE 10 OUTPUT、NODE 11 INPUT

| GENERATION NUMBER | DATA |
|---|---|
| 56839F | 9 |

FIG.32 PRIOR ART

NODE 11 OUTPUT = OUTPUT

| GENERATION NUMBER | DATA |
|---|---|
| 5E7F9F | 9 |

| ADDRESS POSITION | CONTENT |
|---|---|
| 11FE | 0A2 |
| 11FF | 0A3 |
| 1200 | 0A4 |
| 1201 | 0A5 |

ACCESS ADDRESS → 11FF (table labeled 72)

FIG. 41

INPUT PACKET

| GENERATION NUMBER | DATA |
|---|---|
| 6A79FF | 555 |

GENERATE ADDRESS(11FF)
FROM LOWER 5BITS "00100"
OF RIGHT DATA (2A4) AND
PIXEL FIELD "0111111111" OF
GENERATION NUMBER

READ CONTENT FROM ADDRESS
11FF OF TABLE AND SET AT
LOWER 10BITS OF GENERATION
NUMBER

OUTPUT PACKET

| GENERATION PACKET | DATA |
|---|---|
| 6A78A3 | 555 |

DATA DRIVEN TYPE INFORMATION PROCESSING APPARATUS HAVING IMPROVED GENERATION NUMBER TRANSLATION

BACKGROUND OF THE INVENTION

1. Field of the Invention

The present invention relates to a data driven type information processing apparatus for processing data packets including generation numbers and, more particularly, to an improvement in the process of translating generation number of a data packet.

2. Description of the Background Art

FIG. 1 is a block diagram of a conventional data driven type information processing apparatus. Referring to FIG. 1, the conventional data driven type information processing apparatus 130 includes a junction portion (JUNCTION) 54, a firing control portion (FC) 56, a function portion (FP) 140, a program storage portion (PS) 60, a branching portion (BRANCH) 62 and a table memory 132.

Junction portion 54 has two inputs, that is, an input connected to an output of branching portion 62 and an input connected to the outside, and an output connected to an input of firing control portion 56. Junction portion 54 provides junction of an externally applied data packet and a data packet applied from branching portion 62, and applies the result to firing control portion 56. The format of the data packet processed by data driven type information processing apparatus 130 will be described later with reference to FIGS. 3 to 5.

Firing control portion 56 has an output connected to function portion 140. Firing control portion 56 performs the following process on the data packet applied from junction portion 54, and applies an operable data packet to function portion 140. Firing control portion 56 performs the following process referring to instruction information of an applied data packet. If the instruction information is an 1-input instruction, firing control portion 56 transfers the data packet as it is to function portion 140. If the instruction is an instruction having two or more inputs, firing control portion 56 waits for data packets until two packets of which generation number, destination information and instruction information all coincide with each other are detected. If such data packets are collected, firing control portion 56 attaches data portion of one data packet to the other data packet, and transfers the same to function portion 140.

Table memory 132 is provided with a data translation table 70. Data translation table 70 prestores data for performing data translation on the input data packet. At an address of data translation table 70 generated from function portion 140 from a data field of the data packet, as will be described later, translated data calculated in advance with respect to the data is stored.

Referring to FIG. 2, function portion 140 includes a data address generating portion 82, table access circuits 86 and 88, and a multiplexer 90.

Data address generating portion 82 includes two inputs for receiving right data RD and left data LD of a data packet, and an output connected to an input of the first table access circuit 86. When instruction information OPC is a data translation instruction, data address generating portion 82 generates an address for accessing table memory 132 based on the input right and left data, and applies the address to table access circuit 86 and to multiplexer 90. Data address generating portion 82 includes an arithmetic logic unit.

Table access circuit 86 temporarily latches the address applied from data address generating portion, and applies the same together with read/write signal R/W to table memory 132.

Table access circuit 88 temporarily latches the data read from the corresponding address of table memory 132 and applies the same to one input of multiplexer 90.

Multiplexer 90 has one input connected to an output of table access circuit 88 and the other input to which an output from data address generating portion 82 is applied. Multiplexer 90 selectively provides the output from data address generating portion 82 or the output from table access circuit 88, as left data LD, dependent on whether the instruction information OPC is a data translation instruction or not.

In function portion 140, generation number GNT is not processed at all, and it is output to program storage portion 60 as it is.

Again referring to FIG. 1, program storage portion 60 stores in advance a data flow program. Program storage portion 60 fetches a program based on destination information of an applied data packet, rewrites instruction information and destination information of the data packet and provides the same to branching portion 62. Branching portion 62 applies the received data packet again to the junction portion or transfers the received data packet to other peripheral devices and so on, based on the destination information.

FIG. 3 shows formation of a data packet processed in the data driven type information processing apparatus on paths other than the path from firing control portion 56 to function portion 140. Referring to FIG. 3, data packet 150 includes destination information field F1, instruction information field F2, a left operand data field F3 and generation number field F4. Destination information field F1 includes, for example, a destination node field and a processor number field, each consisting of 6 bits. Instruction information field F2, left operand data field F3 and generation number field F4 have the length of 9 bits, 12 bits and 24 bits, respectively, for example.

FIG. 4 shows a format of a data packet 152 applied from firing control portion 56 to function portion 140 of FIG. 1. Data packet 152 includes a destination information field F1, an instruction information field F2, a left operand data field F3a, a right operand data field F3b, and a generation number field F4. Destination information field F1 includes, for example, a destination node field and a processor number field, each consisting of 6 bits. Instruction information field F2, left operand data field F3a, right operand data field F3b and generation number field F4 have the length of 9 bits, 12 bits, 12 bits and 24 bits, respectively, for example.

FIG. 5 shows an exemplary configuration of generation number field F4. Referring to FIG. 5, generation number field F4 includes a field number field FD, a line number field LN and a pixel number field PX. These fields FD, LN and PX have, for example, the lengths of 4 bits, 10 bits and 10 bits, respectively.

The generation number is an identifier for identifying the data of individual data packet input to the data driven type information processing apparatus. For example, when an image data is to be processed, one data packet per one pixel is input one by one with a generation number allotted to each packet, to the data driven type information processing apparatus.

Assume that image data is input to the data driven type information processing apparatus one pixel by one pixel starting from the upper left corner to the right on an image plane. One generation number can be treated as a coordinate of one pixel of the image data. If the generation number is divided into three fields, that is, field, line and pixel as shown in FIG. 5, the coordinate of the image data can be represented in a three-dimensional space, including the time axis.

FIG. 6 schematically shows such an image data coordinate. Referring to FIG. 6, the field (FD) is the coordinate corresponding to the time axis, representing on which image plane the pixel exists. The line (LN) relates to the Y axis, representing on which line of the image plane the pixel exists. The pixel (PX) corresponds to the X axis, representing how far from the left on a line denoted by the line (PX) the pixel exists. In this manner, it can be understood that the generation number is suitable as a representation of the coordinate of the image data.

Referring to FIGS. 1 and 2, the conventional data driven type information processing apparatus generally operates in the following manner. Junction portion 54 merges data packets from branching portion 62 and externally applied data packets, and applies the packets to firing control portion 56. Firing control portion 56 refers to the instruction information of the applied data packet and if the instruction information indicates a 1-input instruction, applies the data packet as it is to function portion 140. If the instruction information of the applied data packet is an instruction having two or more inputs, firing control portion 56 waits for the data packets until two data packets having the same generation number, same destination information and same instruction information are detected. When two such data packets are detected, firing control portion 56 attaches the data portion of one packet to the other packet, and transfers the data packet having such a format as shown in FIG. 4 to function portion 140.

Function portion 140 performs an operation in accordance with the instruction information. For example, if the instruction is other than the data translation instruction, function portion 140 operates in the following manner.

Referring to FIG. 2, multiplexer 90 selects and outputs the output from data address generation portion 82, in response to instruction information OPC. In this case, table memory 132 is not accessed.

When instruction information OPC indicates a data translation instruction, data address generation portion 82 generates an address for accessing the table memory 132 from right data RD and left data LD in accordance with a prescribed method, and applies the generated address to table access circuit 86. Table access circuit 86 latches this address and applies the same together with the read/write signal, to table memory 132. Table memory 132 applies the data stored at the corresponding address to table access circuit 88. Table access circuit 88 temporarily latches this output, and then applies the same to one input of multiplexer 90. Multiplexer 90 selects the output from table access circuit 88 in response to the instruction information OPC.

Again referring to FIG. 1, the data packet provided from function portion 140 is applied to program storage portion 60. Program storage portion 60 fetches the program based on the destination information of the input data packet, and rewrites the portions of the instruction information and destination information of the data packet. Program storage portion 60 applies the data packet to branching portion 62.

Branching portion 62 determines the destination of the data packet based on the destination information of the applied data packet, and transfers the data packet to junction portion 54 or other peripheral devices.

In image data processing, sometimes it becomes necessary to translate a coordinate of the pixel, such as in the case of translation, enlargement, reduction, or rotation of the image. When the generation number is regarded as representing the image data as described above, it is necessary to change the generation number in accordance with the coordinate transformation equation. Conventionally, the generation number has been changed in the following manner. In the conventional apparatus, there are two methods of changing the generation number, that is, a method in which an instruction for performing operation on the generation number directly is used, and a method in which such an instruction is not used. In the following, the conventional method in which generation number operation instruction is not used but only the data operation instruction is used for changing the generation number will be described at first, and then the method in which generation number operation instruction is used will be described.

(1) When Generation Number Operation Instruction Is Not Used

When generation number is to be translated without using the generation number operation instruction in the conventional data driven type information processing apparatus, the following method is employed. First, the generation number is copied on a data field. Here, in order not to change the data field of the data packet, it is necessary to save the content of the data field of the data packet in an accumulator or the like. Thereafter, the generation number copied on the data field is changed using data operation instruction. The changed generation number is re-copied on the generation number field from the data field. The data which has been saved in an accumulator, for example, is restored to the data field of the data packet.

The process will be more specifically described, referring to an example. FIG. 7 is a flow graph of a program in which "2A4" (hexadecimal notation) is to be added to pixel number PX, when the bit lengths of respective fields in the generation number are 4 bits, 10 bits and 10 bits, respectively as shown in FIG. 5. Throughout the specification, the numbers represented by "( . . . )H" such as "(2A4)H" generally represents the hexadecimal number, and the numeral denoted by "( . . . )B" such as "(0011)B" generally represents a binary number.

First, the flow graph of FIG. 7 will be described. Referring to FIG. 7, the numeral on the upper stage of each node represents the node number, and the character in the lower stage represents an instruction performed at that node. A numeral (in hexadecimal notation) in the rectangle on the right shoulder of each node represents right data with respect to the instruction performed at that node. Respective instructions have the following meanings:

"nop" is a 1-input 1-output instruction. In the example shown in FIG. 7, this is used for producing two data packets by copying an input data packet. The two data packets are the same except the destination number.

"agn" instruction is a 2-input 1-output instruction. This instruction is used for shifting generation number of left input to the right by the number of digits designated by the right data, and then to write the result into a left operand field of the data packet.

"add" is a 2-input 1-output instruction. This instruction is to add left data to right data.

"and" instruction is a 2-input 1-output instruction. This instruction is to obtain logical product of left data and right data.

"or" instruction is a 2-input 1-output instruction. This instruction is to obtain a logical sum of left data and right data.

"sgnl" is a 2-input 1-output instruction. By this instruction, right data (content of data field of 2-inputs) is set in lower 12 bits of the generation number of the left input.

Operations at respective nodes of FIG. 7 will be described referring successively to the nodes.

[Node 1]

At node 1, according to the instruction nop, a data packet is copied and two data packets are generated. It is assumed that the input data packet has such a generation number and data as shown in FIG. 8. At node 1, (0)H of the right data is used as a trigger. The generation number and data of the two data packets provided from node 1 are completely the same as that of FIG. 8, as can be seen from FIG. 9. These data packets are applied to nodes 2 and 3, respectively.

[Node 2]

At node 2, the same process as at node 1 takes place. As shown in FIG. 10, the generation number and data of two data packets provided from node 2 are the same as those of the data packet shown in FIG. 8, and the data packets are applied to the left input of node 4 and the left input of node 9, respectively.

[Node 3]

At node 3, according to the agn instruction, the lower 12 bits of the generation number is shifted to the right by (0)H bit (that is, right shift is not performed), so as to shift the same to the data field of the data packet. As the lower 12 bits of the generation number of node 3 input is (9FF)H as shown in FIG. 9, the output of node 3 has (9FF)H in the data field, as shown in FIG. 11.

[Node 4]

At node 4, the same process as at node 3 takes place. The data packet provided from node 4 is shown in FIG. 12.

[Node 5]

At node 5, in accordance with add instruction, (2A4)H is added to the data field of the input data packet. The result is as shown in FIG. 13. The data packet is applied to node 7. The value of the data field is the result of addition of (2A4)H to the lower 12 bits of the generation number.

[Node 6]

At node 6, logical product of the content in the data field of the data packet output from node 4 and (C00)H is provided. The bit pattern of (C00)H is "110000000000", and therefore the content of the data field of the output from node 6 is a concatenation of (00)H and higher 2 bits of the 12 bits of data in the data field of the input data packet. In this example, the output from node 6 is (800)H as shown in FIG. 14.

[Node 7]

At node 7, a logical product between the value of the data field in the input data packet and (3FF)H is provided. Since the bit pattern of (3FF)H is "001111111111", (00)B and the value of lower 10 bits of the value of the data field of the input data packet are concatenated by the process at node 7, and stored in the data field of the output data packet at node 7. The output data packet of node 7 is as shown in FIG. 15.

[Node 8]

At node 8, a logical sum of right input data and left input data is obtained. The lower 10 bits of left input data are all zeroes, and higher 2 bits of right input data are "00". Therefore, by the process at node 8, a value of 12 bits in which higher 2 bits of left input data and lower 10 bits of right input data are concatenated, is set in the data field of the output data packet. The content of the output data packet at node 8 in this example is as shown in FIG. 16.

[Node 9]

At node 9, a process for setting the content of the data field of the right input to lower 12 bits of the generation number field of the left input is performed. In other words, the translated generation number stored in the data field is set in lower 12 bits of the generation number field. Further, in the data field, the original data content which has been saved in an accumulator, for example, is set. The content at the output of node 9 in this example is as shown in FIG. 17.

Namely, by the process shown in FIG. 7, a process for adding (2A4)H to the lower 12 bits of the generation number of the input data packet is realized.

However, when generation number operation instruction is not used, a large number of steps are necessary as described above, even when the generation number is to be translated in accordance with a simple arithmetic operation. This imposes considerable difficulty in developing a program for translation. Further, since it is necessary to perform a large number of steps, real time processing of image data becomes very difficult. Further, when translation of general image data including enlargement, reduction, rotation of image data is to be performed, it is very difficult and troublesome to produce a necessary algorithm without using the generation number operation instruction. Further, the load of processing for execution is formidable. Therefore, real time processing is difficult even in a standardized enlargement, reduction or rotation.

(2) When Generation Number Operation Instruction Is Used

The generation number operation instruction is an instruction for performing a certain operation on the field number, line number or the pixel number of the generation number in the input data packet, by using a value of the operand data of the right input. By generation number operation instruction, the content of the generation number is directly translated. It is not necessary to shift the generation number to the data field, save the content in the data field in advance or to restore the content after translation.

An example of the generation number operation instruction is "addpx" instruction. FIG. 18 shows a flow graph when the process of (1) described above (flow graph of FIG. 7) is to be carried out using this instruction. The instruction "addpx" is to add the value of the right data to the pixel number in the generation number. However, in this example, it is assumed that there is not a carry to the line number LN field after addition, and that there is no clipping with respect to the result of addition. The flow graph in this example is very simple, as shown in FIG. 18.

The conventional processing for rotating the image data by using such generation number operation instruction will be briefly described in the following.

Referring to FIG. 19, let us assume an operation of rotation by $\pi/4$ about a point A at pixel number=(1FF)H and line number=(200)H, on an image plane of the field number FD=(5)H. The field number, pixel number and the line number of the point B which is the object of translation is represented as (5)H, px1 and ln1, respectively. Axes of coordinates px and ln are plotted on the upper side and left side of FIG. 19. The X and Y axes are shown in the lower and right sides of FIG. 19.

It is assumed that px1=x1, (3FF)H−ln1=y1. The pixel number of a point C obtained by rotating the point B by $\pi/4$ is px2=x2, and the number is ln2, in the similar manner. It is assumed that (3FF)H−ln2=y2. The point A represented by the coordinate notation of (X, Y) corresponds to (1FF, 200) (hexadecimal notation). The angle formed by the segment AB with the direction of the X axis is represented by $\alpha$ and the length of the segment AB is represented by a, as shown in FIG. 19. Therefore, the following relations hold.

$$x2 = a \cdot \cos(\alpha + \pi/4) + (1FF)H \qquad \langle 1 \rangle$$

$$y2 = a \cdot \sin(\alpha + \pi/4) + (200)H \qquad \langle 2 \rangle$$

$$a = \sqrt{\{(x1-(1FF)H)^2 + (y1-(200)H)^2\}}$$

By modifying equations <1> and <2>, the following equations <3> and <4> are obtained.

$$x2=a \cdot (\cos \alpha - \sin \alpha)/\sqrt{2} + (1FF)H \qquad <3>$$

$$y2=a \cdot (\cos \alpha + \sin \alpha)/\sqrt{2} + (200)H \qquad <4>$$

where, $\cos \alpha = (x1-(1FF)H)/a$, $\sin \alpha = (y1-(200)H)/a$. Accordingly, $$x2=(x1-y1+1)/\sqrt{2}+(1FF)H \qquad <5>$$

$$y2=(x1+y1-(3FF)H)/\sqrt{2}+(200)H \qquad <6>$$

Because of the relations (3FF)H−ln1=y1, px2=x2 and px1=x1 mentioned above, the following equation <7> can be obtained.

$$px2=(px1+ln1-(3FE)H)/\sqrt{2}+(1FF)H \qquad <7>$$

From the relation (3FF)H−ln2=y2, px1=x1 and (3FF)H−ln1=y1, the following equation <8> can be obtained based on the equation <6>.

$$ln2=(-px1+ln1)/\sqrt{2}+(1FF)H \qquad <8>$$

From the equations <7> and <8>, the flow graph of this process is as shown in FIG. 20. The generation number operation instructions appearing for the first time in FIG. 20 are as follows. In the processing in accordance with the instruction described below, it is assumed that there is not a carry, borrow bit or clipping.

"subpx" is an instruction for subtracting right data from the pixel number of left data.

"subln" is to subtract right data from the line number of left data.

"addln" is to add the right data to the line number of left data.

"mulpx4" is to multiply the pixel number of the left data by the right data, and further to set the value shifted to the right by 4 bits in the pixel field of the generation number. For example, at node 8, (B)H ("11" by decimal notation) is provided as the right data. Therefore, by the processing at node 8, the pixel number of the left data is multiplied by "11/16". This calculation is for approximation of "÷√2" appearing in equations <7> and <8>.

"mulln4" is to multiply the line number of left data by the right data and to set the result shifted by 4 bits to the right in the line field of the generation number. For example, at node 9, (B)H is used as the right data. Therefore, by this instruction, the line number is multiplied by "11/16". This instruction is also for approximating the process of dividing the line number by √2.

FIGS. 21 to 32 show generation numbers of the data packets input to respective nodes and contents of the data. It is assumed that the input data packet includes the generation number (5FFDFF)H and data (9)H, as shown in FIG. 21. The output data packet has the generation number (5E7F9F)H and the data (9)H, as shown in FIG. 32.

When generation number operation instruction is used, only a simple process such as shown in FIG. 18 is necessary to translate the generation number by simple arithmetic operation. However, when general image data such as shown in FIGS. 19 and 20 is to be translated, the scale of the flow graph therefor is considerably large. Therefore, it takes long time.

Further, such a process as "division by √2" can be performed only by approximation, such as multiplication by "11/16". Namely, precision in translating the generation number is not very high. The precision in approximation may be improved by performing such an instruction as mulln4 for a number of times. However, the necessary process time is increased accordingly.

Meantime, a "delay" instruction is proposed in an article entitled "Specification of Pictorial Data Driven Type Language UL1" (AKECHI Mitsuo et al. Proceedings of 32nd National Conference of the Institute of Information Processing Engineers (former half of 1986), pp. 209–210, 1986). This instruction represents "output of a token delayed by one generation from an input token". In other words, it is an instruction for adding 1 to the generation number. By using this instruction, a process for adding a certain value directly to the generation number can be implemented. For example, when 3 is to be added to the generation number, the delay instruction should be repeated three times.

However, even when this instruction is used, an operation including subtraction, multiplication and division cannot be realized, and the process for rotation described above is not possible. Further, when the configuration of generation number is variable, such processing becomes more difficult.

SUMMARY OF THE INVENTION

Therefore, an object of the present invention is to provide a data driven type information processing apparatus in which generation number can be translated easily at high speed with high precision.

Another object of the present invention is to provide a data driven type information processing apparatus in which generation number can be translated easily at high speed with high precision in accordance with a desired manner.

A still further object of the present invention is to provide a data driven type information processing apparatus in which generation number can be translated easily at high speed with high precision in accordance with a desired manner, even when the method of allocation of the generation number is variable.

An additional object of the present invention is to provide a data driven type information processing apparatus in which a desired field of the generation number can be translated easily at high speed with high precision in accordance with a desired manner.

A still further object of the present invention is to provide a data driven type information processing apparatus in which a desired field of the generation number can be translated easily at high speed with high precision in accordance with a desired manner, even when the method of allocation of the generation number is variable.

A still further object of the present invention is to provide a data driven type information processing apparatus in which the generation number and the content of the data field can be translated easily at high speed with high precision.

The data driven type information processing apparatus in accordance with the present invention includes a generation number translation table, and a generation number translation circuit.

The generation number translation table stores a plurality of translated generation numbers. The translated generation numbers are calculated in advance in association with the generation numbers in accordance with a prescribed functional relation. An address of the translated generation number is specified by a prescribed calculation with respect to the generation number. The generation number translation circuit accesses, in response to the instruction information stored in the applied data packet being the generation number translation instruction, the generation number translation table based on the content of the generation number field of the applied data packet, and reads the corresponding translated generation number. The generation number translation circuit further rewrites the generation number of the applied data packet by the read translated generation number.

The generation number can be translated easily with a small number of instructions in accordance with a prescribed functional relation. Further, the translated generation numbers can be prepared in advance with desired precision, and therefore desired precision of translation is ensured. As a result, a data driven type information processing apparatus in which generation number can be translated easily at high speed with high precision can be provided.

According to an aspect of the present invention, the generation number translation circuit includes an address generating circuit, a table access circuit and a rewriting circuit.

Address generating circuit generates, in response to the instruction information stored in the applied data packet which is a generation number translation instruction, the address of the generation number translation table in accordance with a prescribed calculation based on the content of the applied data packet. The table access circuit accesses the generation number translation table, using the output from address generation circuit as an address, and reads the corresponding translated generation number. The rewriting circuit rewrites a portion of the generation number field of the applied data packet by the output of the table access circuit, in accordance with the instruction information stored in the applied data packet.

According to one embodiment of the present invention, the data driven type information processing apparatus further includes a circuit for outputting a generation number field allocation setting signal. The generation number field allocation setting signal specifies the length of field allotted to each partial field when the generation number field is divided into a plurality of partial fields.

The address generating circuit generates an address based on a content of a partial region which is determined by instruction information included in the applied data packet, of the plurality of partial fields specified by the generation number field allocation setting signal, in the generation number field.

Preferably, the data driven type information processing apparatus may further include a switch for outputting the generation number field allocation setting signal for specifying the length of the field allotted to each partial region, when the generation number field is divided into a plurality of partial fields. The address generating circuit generates an address based on the content of the partial field determined by the instruction information, of the plurality of partial fields specified by the generation number field allocation setting signal. The rewriting circuit may rewrite the content of the field determined by the instruction information of the plurality of partial fields, by using the output from the table access circuit.

According to another aspect, the data driven type information processing apparatus further includes a data translation table. The data translation table stores a plurality of translated data. The translated data are prepared in advance in association with the content of the data field of the data packet with a prescribed relation. The address of the translated data is specified by translating the content of the data field of the data packet in accordance with a prescribed method. The data translation table is allotted with addresses which are different from those of the generation number translation table. The generation number translation circuit includes a first address generating circuit, a second address generating circuit, a table access circuit and a rewriting circuit.

The first address generating circuit generates, in response to the instruction information stored in the applied data packet being a generation number translation instruction, an address of the generation number translation table by a prescribed calculation, based on the content of the applied data packet. The second address generating circuit generates, in response to the instruction information stored in the applied data packet being a data translation instruction, an address of the data translation table based on the content of the data field of the applied data packet. The table access circuit accesses the generation number translation table or the data translation table using an output from the first address generating circuit or an output from the second address generating circuit as an address, in accordance with the instruction information stored in the applied data packet, and reads the corresponding translated generation number or the translated data. The rewriting circuits rewrites, when the instruction information stored in the applied data packet is a generation number translation instruction, the generation number of the applied data packet with the output from the table access circuit. The rewriting circuit rewrites, when the instruction information stored in the applied data packet is a data translation instruction, part of the data field of the applied data packet with the output from the table access circuit.

In accordance with the instruction information included in the applied data packet, an address for accessing the generation number translation table or an address for accessing the data translation table is generated. Dependent on whether the instruction information is a generation number translation instruction or a data translation instruction, one of these is used as the address for accessing selectively the generation number translation table or the data translation table, and corresponding translated generation number or translated data is read from the table. In accordance with the instruction information, the generation number or data field is rewritten by the read data. Dependent on which instruction information is included in the data packet, either of the generation number or data can be selectively translated. The precision of the translated data depends on the precision in calculation in preparing the table, and therefore the precision can be readily adjusted.

As a result, a data driven type information processing apparatus in which both the generation number and the content of the data field can be translated easily at high speed with high precision can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8–17 schematically show data and generation number of processing by the conventional apparatus.

FIGS. 21–32 schematically show the generation number and the content of data of the data packet in the flow graph of FIG. 20.

FIG. 41 schematically shows a process executed by function portion 58 with respect to the rpx instruction.

DETAILED DESCRIPTION OF THE PREFERRED EMBODIMENTS

Figure 33:
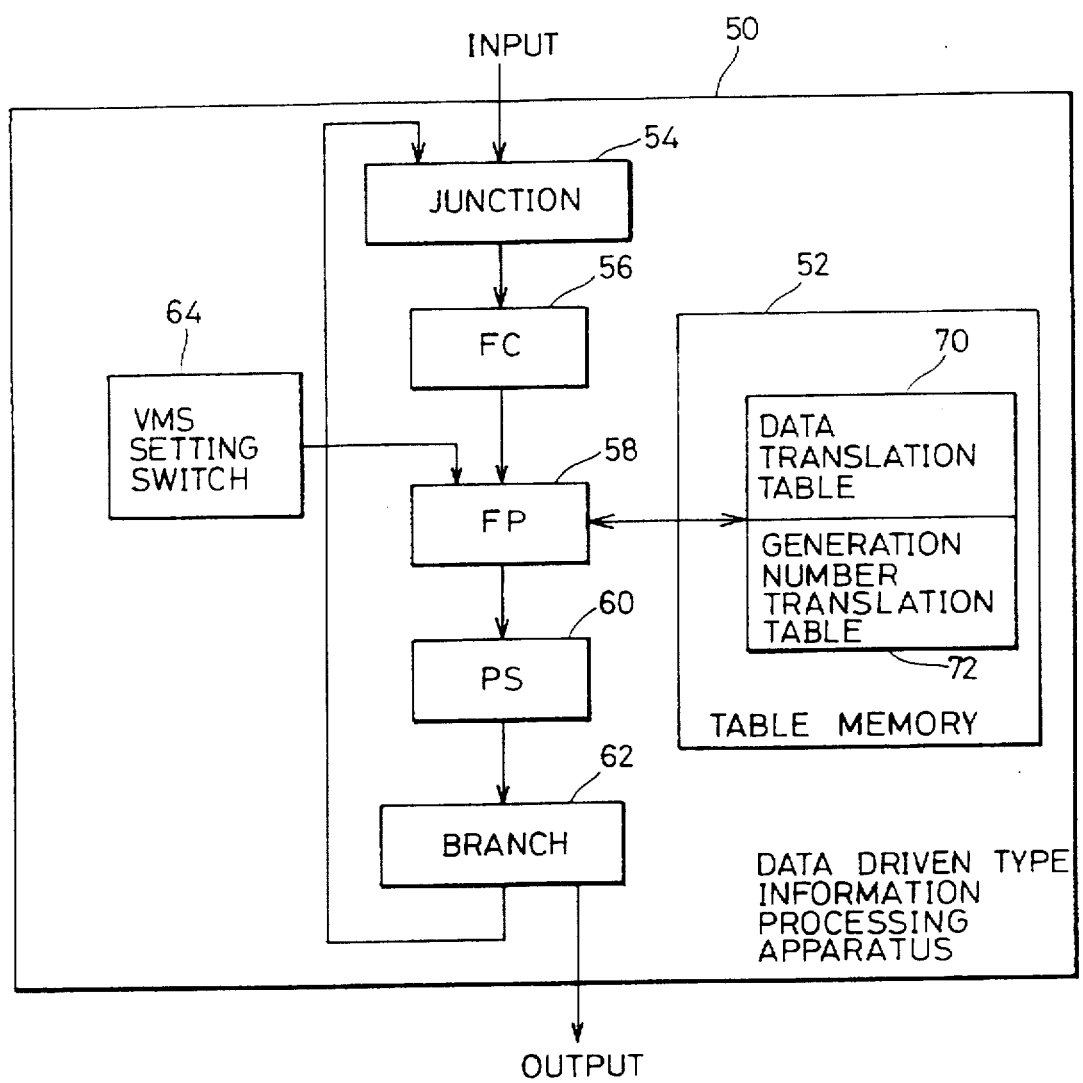
FIG. 33 is a block diagram of a data driven type information processing apparatus in accordance with one embodiment of the present invention.

FIG. 33 is a block diagram of a data driven type information processing apparatus in accordance with one embodiment of the present invention. Referring to FIG. 33, the data driven type information processing apparatus 50 of the present embodiment includes a junction portion (JUNCTION) 54, a firing control portion (FC) 56, a function portion (FP) 58, a program storage portion (PS) 60, a branching portion (BRANCH) 62, a manually operable VMS setting switch 64 for applying a generation number field allocation setting signal VMS to the function portion 58, and a table memory 52.

Figure 1:
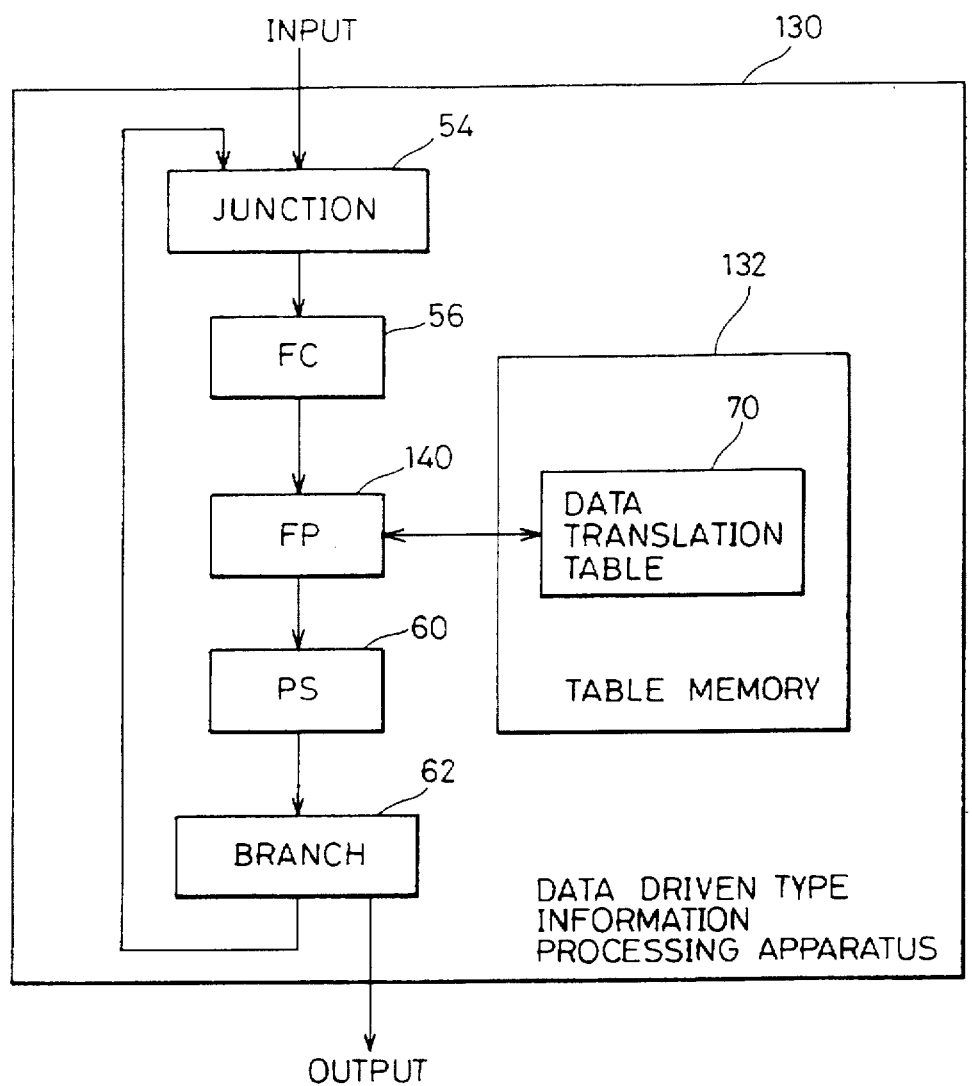
FIG. 1 is a block diagram of a conventional data driven type information processing apparatus.
Figure 2:
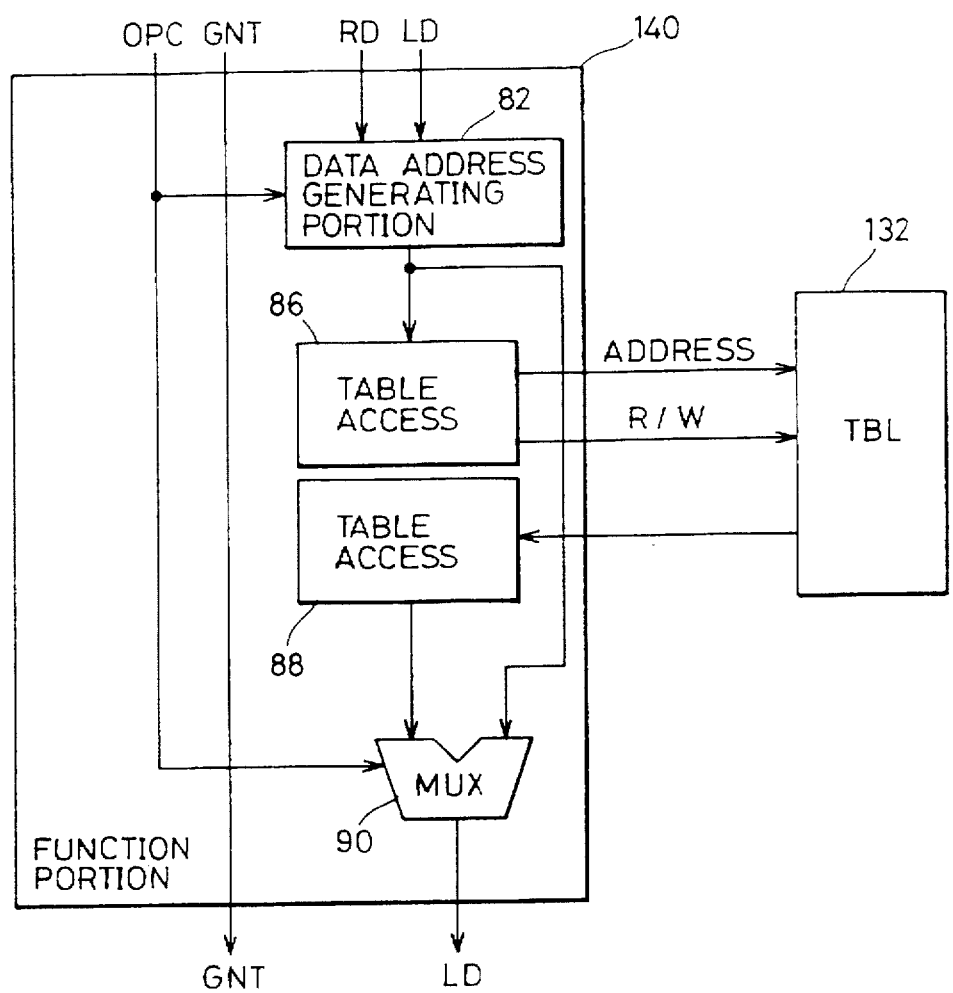
FIG. 2 is a block diagram of a function portion of a conventional data driven type information processing apparatus.
Figure 3:
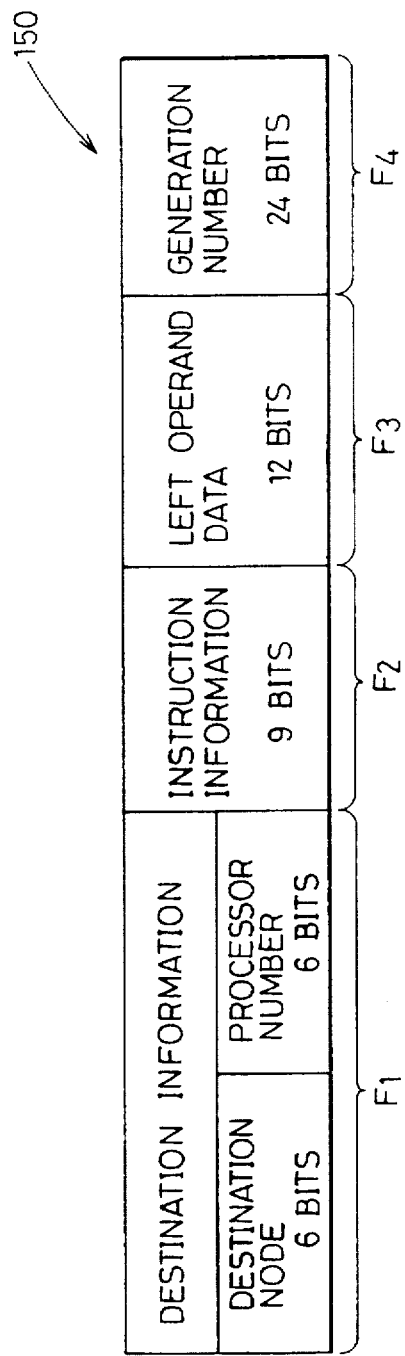
FIG. 3 is a schematic diagram showing a field configuration of a data packet.
Figure 4:
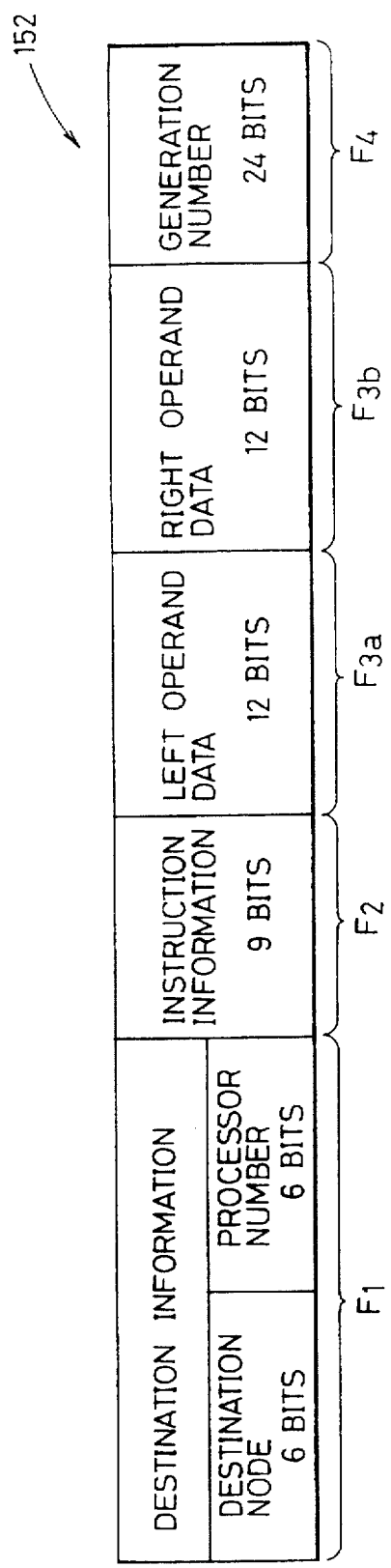
FIG. 4 is a schematic diagram showing a field configuration of a data packet output from a firing control portion.
Figure 5:
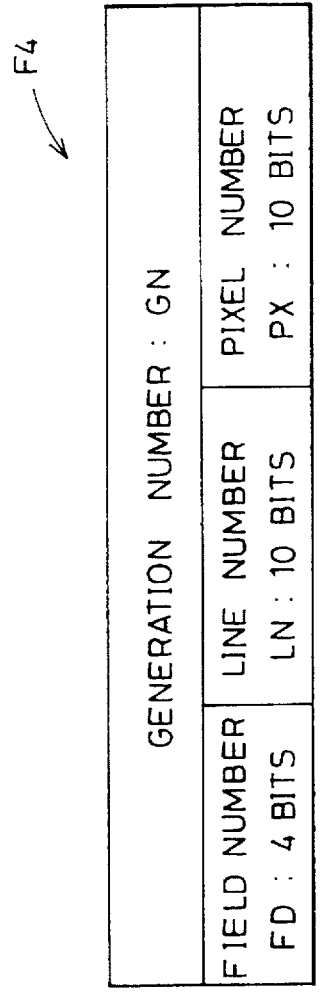
FIG. 5 is a schematic diagram showing an example of a generation number.
Figure 6:
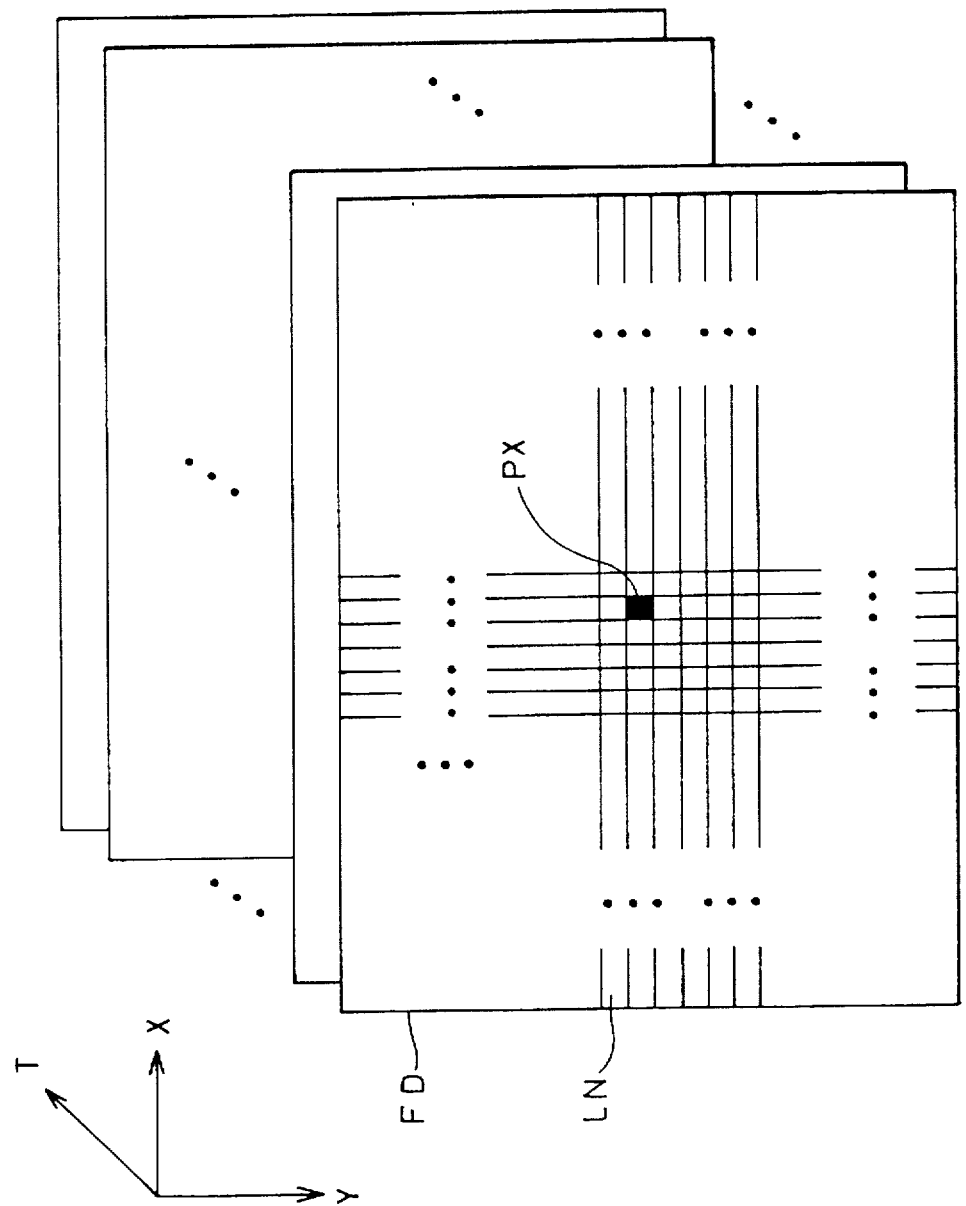
FIG. 6 is a schematic diagram showing relationship between generation number and pixel on an image plane, in image processing.

Table memory 52 includes a data translation table 70 which is similar to that shown in FIG. 1, and a generation number translation table 72. The content of generation number translation table 72 will be described later with reference to FIG. 35.

Junction portion 54, firing control portion 56, program storage portion 60 and branching portion 62 are the same as those shown in FIG. 1. Therefore, detailed description thereof is not repeated here.

VMS setting switch 64 is a manually operable switch and, in this embodiment, applies a generation number field allocation setting signal VMS of 2 bits to function portion 58.

Figure 34:
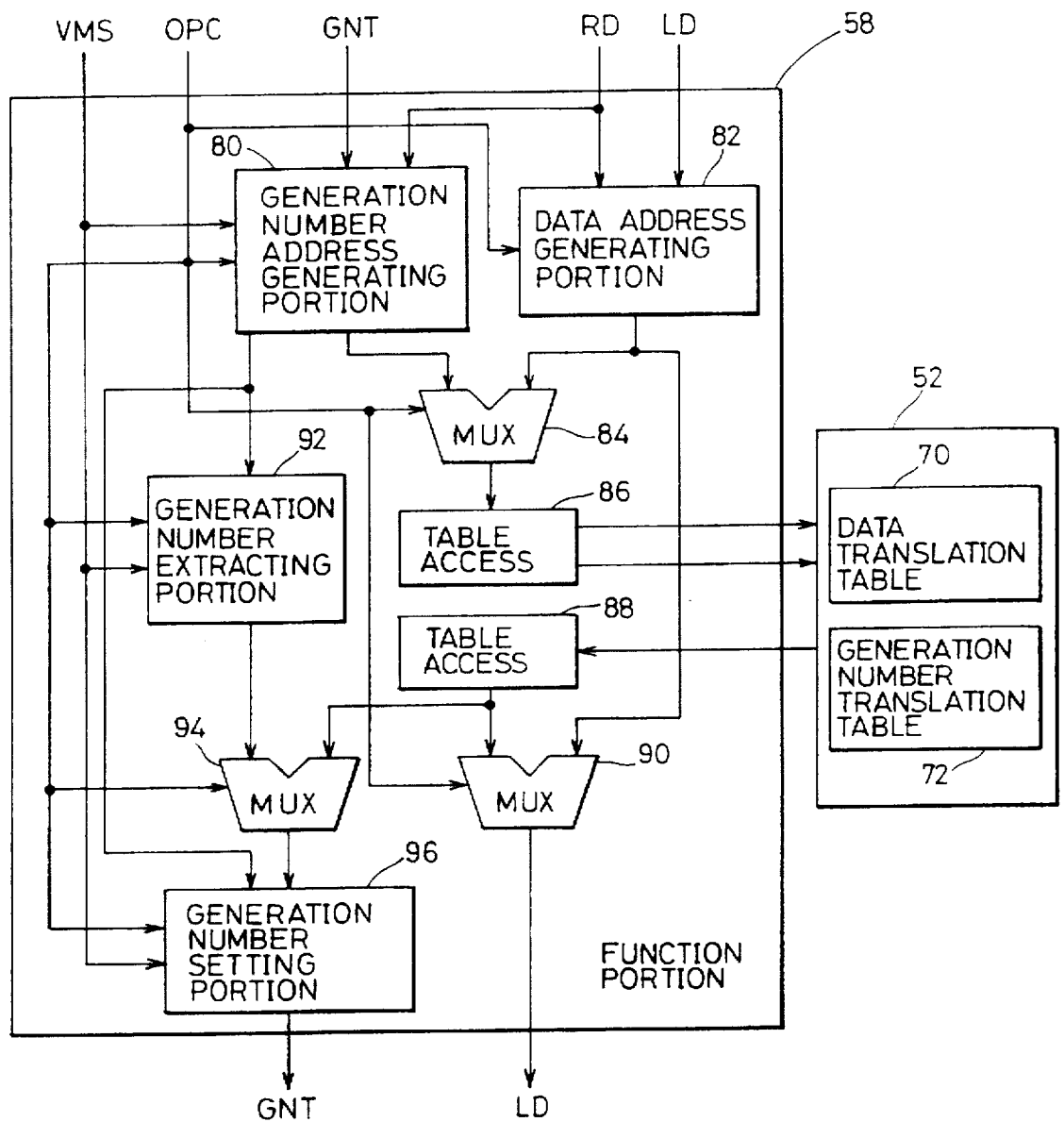
FIG. 34 is a block diagram of a function portion 58 shown in FIG. 33.

FIG. 34 shows the details of function portion 58. Referring to FIG. 34, function portion 58 includes a data address generating portion 82, table access circuits 86 and 88, a multiplexer 90 and, in addition, a generation number address generation portion 80, a multiplexer 84, a generation number extracting portion 92, a multiplexer 94 and a generation number setting portion 96.

Generation number address generating portion 80 receives generation number GNT and right data RD, and responsive to VMS signal and instruction information OPC, generates an address for translating the generation number.

Multiplexer 84 selects one of the outputs from generation number address generating portion 80 and data address generating portion 82 and applies the selected one to table access circuit 86, in response to instruction information OPC.

Generation number extracting portion 92 receives the generation number GNT output from generation number address generating portion 80, and outputs only the content of that field which is specified by the VMS signal and instruction information OPC of the generation number GNT, in response to the instruction information OPC and the VMS signal.

Multiplexer 94 selects and outputs either the output from generation number extracting portion 92 or the output from table access circuit 88, in response to instruction information OPC.

Generation number setting portion 96 receives outputs from generation number address generating portion 80 and multiplexer 94, rewrites a portion specified by the VMS signal and instruction information OPC of the output from generation number address generating portion 80 with the output from multiplexer 94, and provides the result as an output.

The output from generation number setting portion 96 is the generation number GNT provided from function portion 58. The output from multiplexer 90 is the left operand data LD provided from function portion 58. Though not shown in FIG. 34, instruction information OPC and destination information are also applied from function portion 58 to program storage portion 60 (see FIG. 33).

Functions of data address generating portion 82, table access circuits 86 and 88 and multiplexer 90 are the same as those of the prior art example shown in FIG. 1. Therefore, details thereof are not repeated here. Table access circuit 86 can access both the data translation table 70 and generation number translation table 72 shown in FIG. 33. Which is to be accessed depends on the address applied from multiplexer 84. These addresses are generated from generation number address generating portion 80 or data address generating portion 82, as already described.

Figures 35, 36:
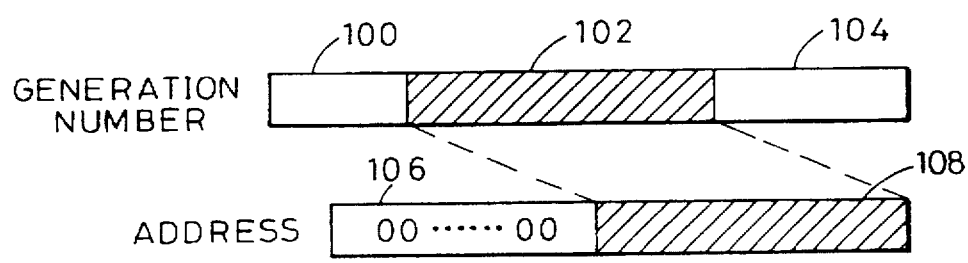
FIG. 35 is a schematic diagram showing content of generation number translation table 72.
FIG. 36 is a schematic diagram showing a method of generating an address of the generation number translation table.

FIG. 35 shows part of the content in the generation number translation table 72 shown in FIG. 33. Referring to FIG. 35, at an address position generated in accordance with a prescribed method from the generation number in the generation number translation table 72, the content of the translated generation number after prescribed translation with respect to the generation number has been calculated and stored in advance.

However, in this case, the content of the translated generation number may be a part of the generation number such as the field number, line number or the pixel number, or it may be the generation number as a whole. The manner of storage varies dependent on how fields are allotted to the field number, line number and pixel number of the generation number, and on the content of translation operation. In the example shown in FIG. 35, content for implementing an addition of (2A4)H to the pixel number of the generation number simply is stored.

Generation number address generation portion 80 shown in FIG. 34 has the following function. In response to the input VMS signal and instruction information OPC, generation number address generating portion 80 divides the generation number field into fields 100, 102 and 104 as shown in the upper part of FIG. 36, takes out a specific field 102 thereof, and sets the field at lower address 108 of the generation number address. In each of the higher addresses 106, (0)B is set in this embodiment. The fields 100, 102 and 104 may be the field number, line number and pixel number fields of the generation number, or the fields may be the part of these number fields. The bit length of the address is specified by an instruction code. The generation number address generating portion 80 includes an ALU. In this address calculation, value of a data field, for example the right data of the data packet may be used, as will be described later.

Figure 37:
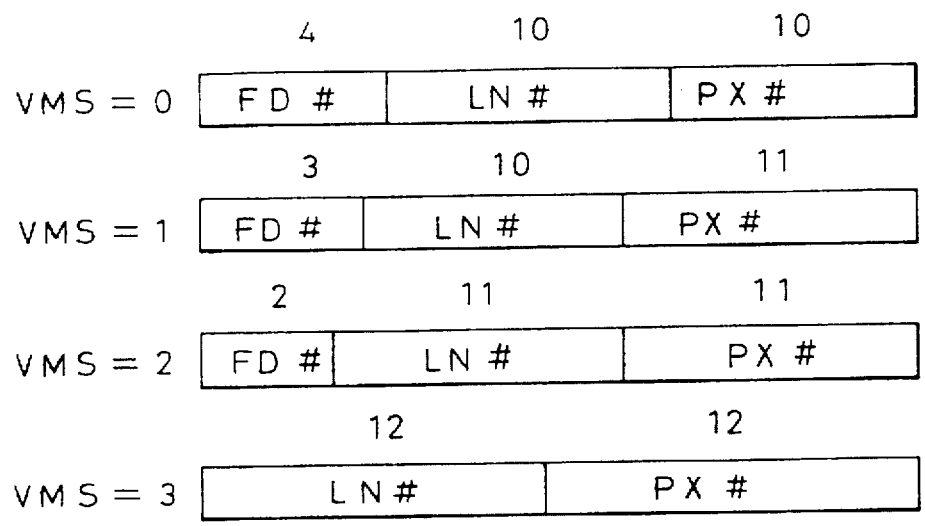
FIG. 37 is a schematic diagram showing relation between the VMS signal and allocation of generation number field.

FIG. 37 shows an example of allocation of the generation number field to the field number, the line number and the pixel number in accordance with the VMS signal. When the value of the VMS signal is 0, fields of 4 bits, 10 bits and 10 bits are allotted to these, respectively. When the value of the VMS signal is 1, then 3 bits, 10 bits and 11 bits are allotted. If the value of the VMS signal is 2, 2 bits, 11 bits and 11 bits are allotted, respectively. When the value of the VMS signal is 3, 0 bit, 12 bits and 12 bits are allotted. FIG. 37 is merely an example and allocation of the generation number may be carried out in other method.

In this embodiment, it is assumed that the VMS signal is a 2-bit signal. However, this signal may include 1 bit or three or more bits. In accordance with the VMS signal, generation number extracting portion 92 determines which of the four methods of allocation shown in FIG. 37 is to be selected. In accordance with instruction information OPC, generation number extracting portion 92 determines which portion of which field is to be extracted from the respective fields allotted as shown in FIG. 37, and applies only that portion to one input of multiplexer 94. Processing in generation number extracting portion 92 is determined by the combination of the values of the VMS signal and instruction information OPC, and therefore it can be implemented by a circuit having basically the same structure as data address generating portion 82.

Generation number setting portion 96 performs approximately the reverse operation as that of generation number extracting portion 92. More specifically, generation number setting portion 96 rewrites the value of a field specified by the VMS signal and the instruction information OPC of the generation number GNT output from generation number address generating portion 80, by the output from multiplexer 94. The output from multiplexer 94 is either the value extracted by generation number extracting portion 92 or the output from table access circuit 88, dependent on the instruction code OPC.

Figure 38:
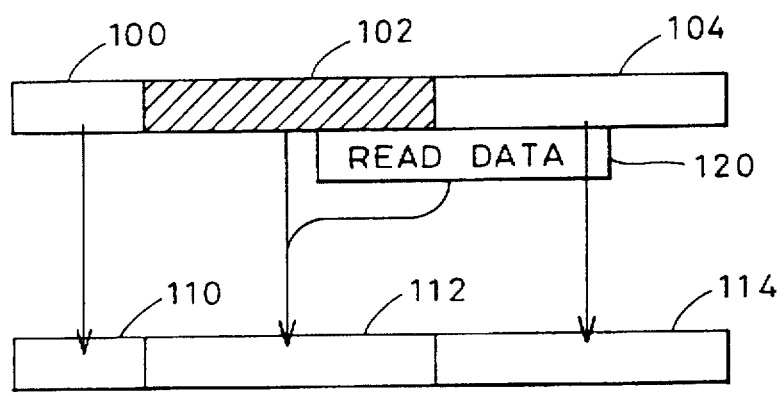
FIG. 38 schematically shows content of operation of the generation number setting portion.

Thus, functions of generation number extraction portion 92, generation number setting portion 96 and multiplexer 94 are as follows. Referring to FIG. 38, generation number extracting portion 92 divides an input generation number GNT to three fields 100, 102 and 104. The manner of allocation is determined by the VMS signal and instruction information OPC, as described above. Generation number setting portion 96 sets the values of fields 100 and 104 of the generation number as they are at output fields 110 and 114. Multiplexer 94 selects, in accordance with instruction information OPC, which of the content of field 102 of the generation number or the read data 120 read from the table is to be stored in the field 112 of the output generation number. The data selected in this manner is set in the field 112 by generation number setting portion 96, and the result as a whole is provided as the generation number GNT.

Figure 18:
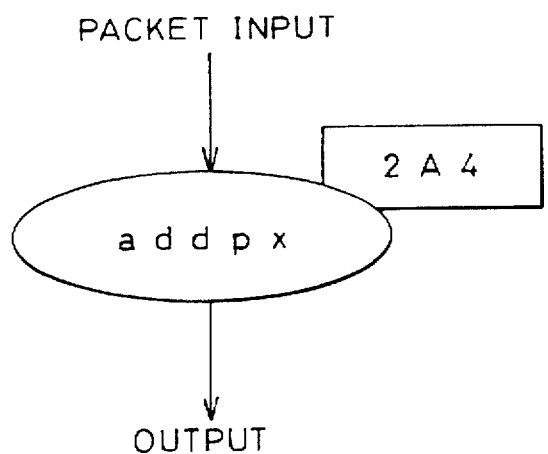
FIG. 18 is a flow graph when a generation number operation instruction addpx is used in a conventional apparatus.
Figure 19:
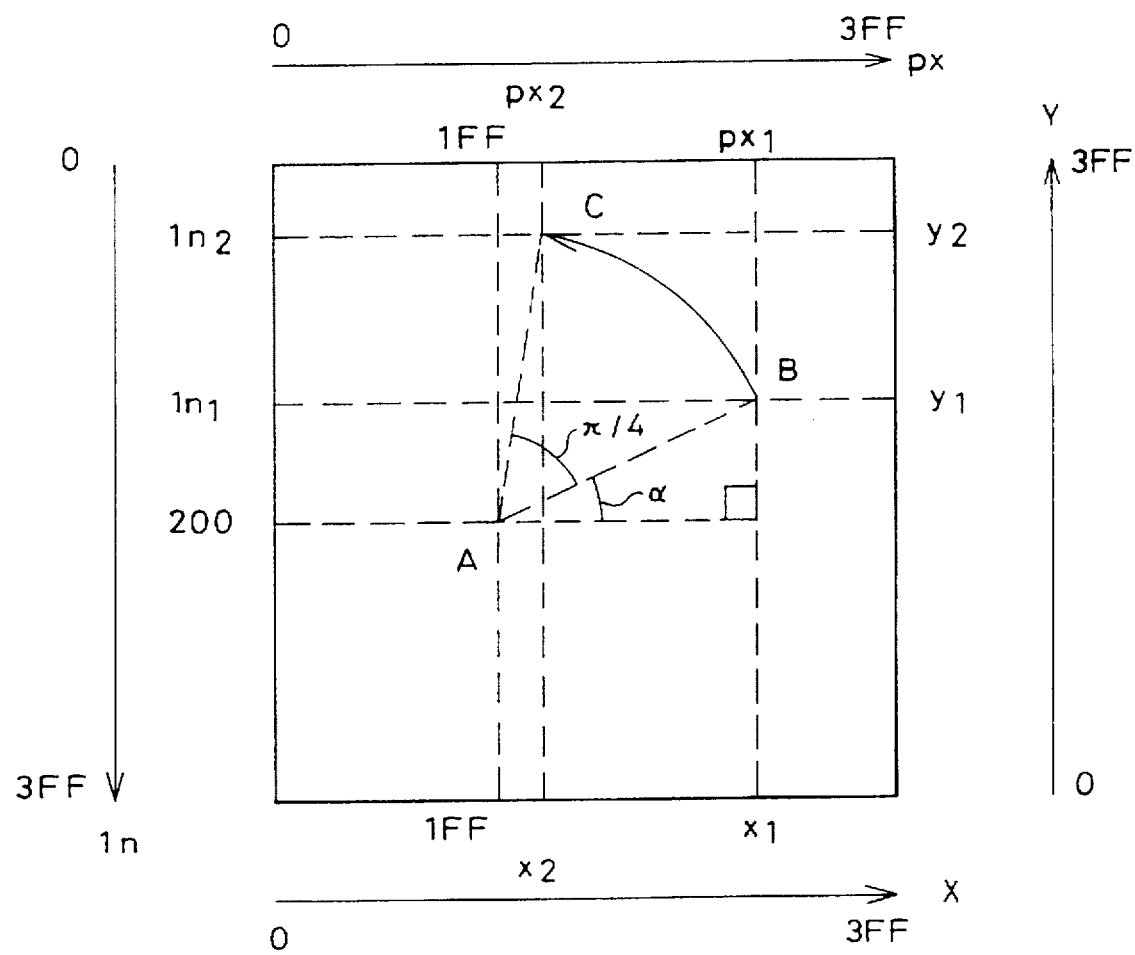
FIG. 19 is a schematic diagram showing rotation operation of a point on an image plane.
Figure 20:
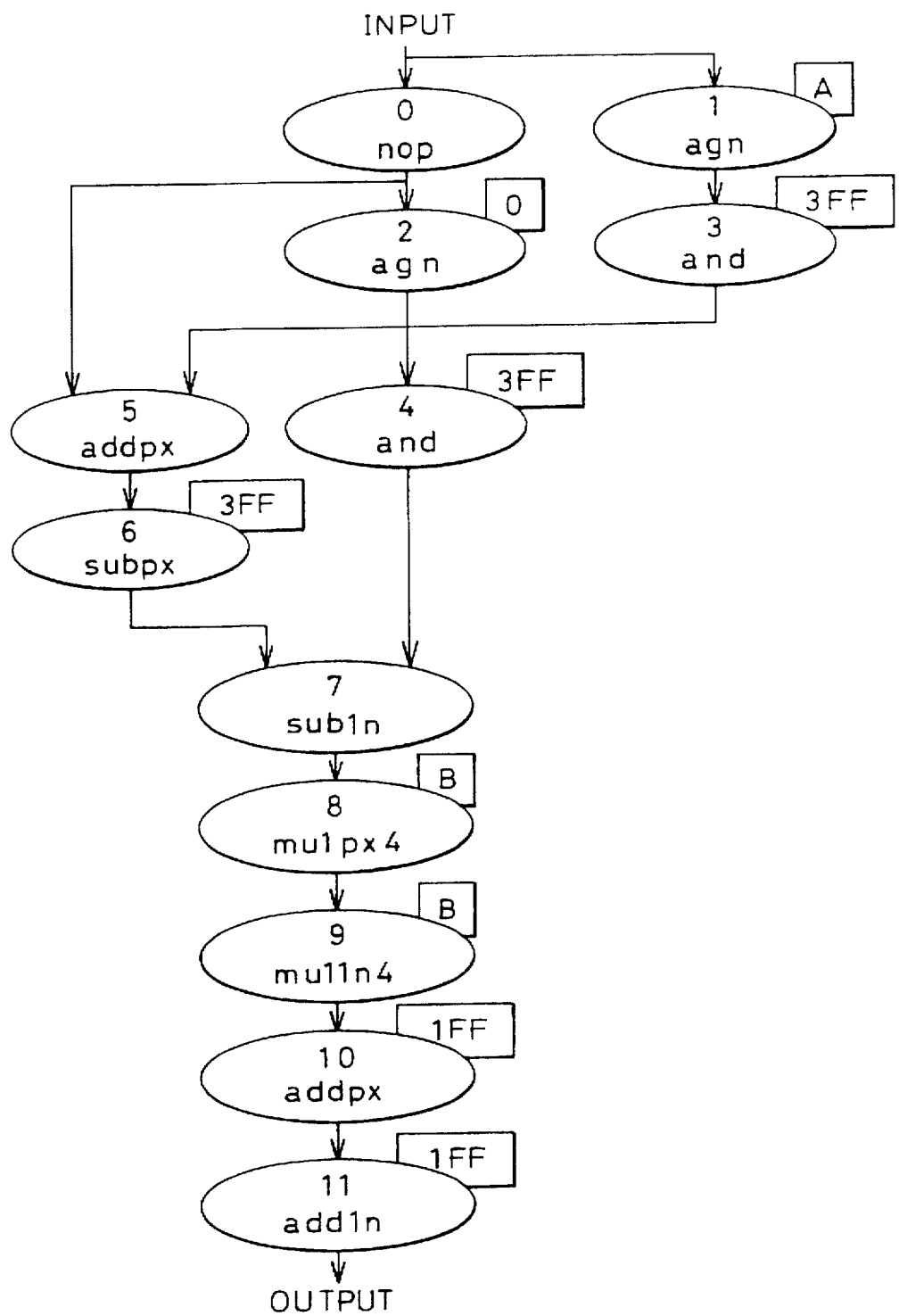
FIG. 20 is a flow graph for realizing rotation operation shown in FIG. 19 by using the generation number operation instruction in the conventional apparatus.
Figure 39:
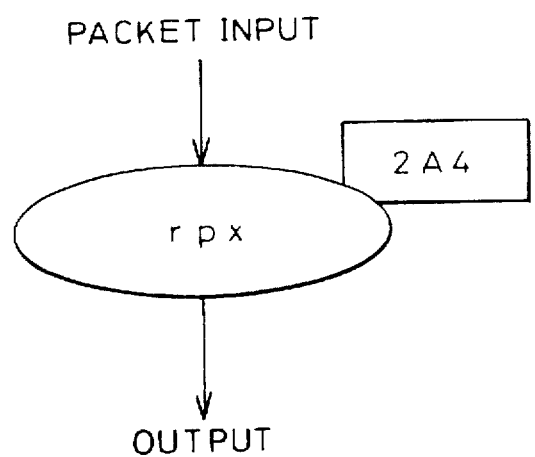
FIG. 39 is a flow chart of an rpx instruction.
Figure 40:
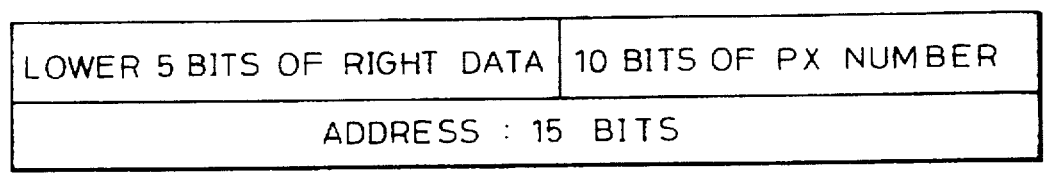
FIG. 40 is a schematic diagram showing configuration of an address in a specific example.

The operation of this embodiment will be described referring to a translation instruction for the pixel number, which is called the rpx instruction, as an example. The instruction rpx corresponds to the process shown as the prior art in FIGS. 7 and 18. FIG. 39 shows the data flow graph. By the rpx instruction, the generation number translation table is referred to using the pixel number as lower address and some lower bits of the right data as the higher address, and the read value is set in the pixel number field of the output data packet. However, the left operand data of the left input is saved. In this example, 10 bits of the px number serve as the lower address and lower 5 bits of the right data serve as the higher address (see FIG. 40).

FIG. 41 shows the content of an input packet, the content of processing performed by the data driven type information processing apparatus and the content of an output data packet, as an example. As shown in FIG. 41, as an example, a packet having the generation number of (6A79FF)H and data of (555)H is input. First, from lower 5 bits (00100)B of right data (2A4)H and the pixel field (0111111111)B of the generation number shown in FIG. 39, an address (11FF)H is generated. This generation is performed by the generation number address generating portion 80 shown in FIG. 34. It goes without saying that allocation of the field of the generation number and which part is to be used for address generation are determined by the VMS signal and the instruction information OPC.

Referring to FIG. 34, multiplexer 34 selects and provides, to table access circuit 86, an output from generation number address generation portion 80, in response to the instruction information OPC which is the rpx instruction. Therefore, by table access circuits 86 and 88, from the address (11FF)H of generation number translation table 72 in table memory 52, corresponding data (0A3)H (see FIG. 35) is read and applied to multiplexers 90 and 94.

In response to the instruction information OPC being the rpx instruction, multiplexer 94 selects the output from table access circuit 88 and applies the output to generation number setting portion 96. Therefore, as already described with reference to FIG. 38 with respect to the functions of generation number extracting portion 92, generation number setting portion 96 and multiplexer 94, the value of the generation number of the output packet would be (6A78A3)H as shown in FIG. 41. In response to the instruction information OPC being rpx, multiplexer 90 selects the output from data address generating portion 82. Therefore, data (555)H of the input packet is output as it is. This is shown as the content of the output in FIG. 41.

Generally, when instruction information OPC is a generation number translation instruction, multiplexer 84 selects the output from generation number address generating portion 80, and if instruction information OPC is a data translation instruction, it selects an output from data address generation portion 82. When instruction information OPC is a generation number translation instruction, multiplexer 94 selects an output from table access circuit 88, and otherwise, it selects the output from generation number extracting portion 92. When instruction information OPC is a data translation instruction, multiplexer 90 selects an output from table access circuit 88, and otherwise it selects an output from data address generating portion 82.

Figure 7:
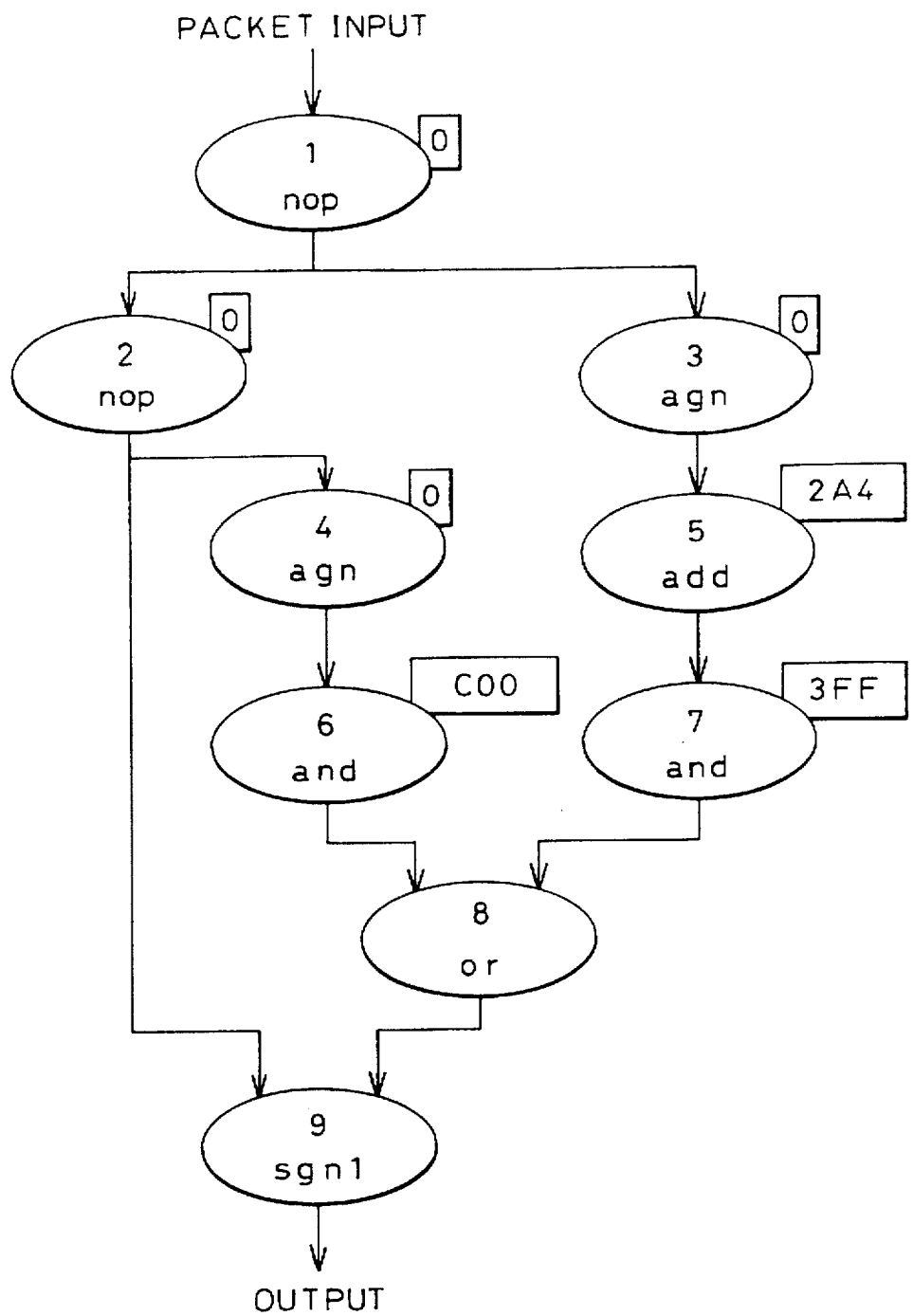
FIG. 7 is a flow graph showing an example of generation number translation by a conventional data driven type information processing apparatus.

As described above, by the data driven type information processing apparatus of this embodiment, the process such as shown in FIG. 7 can be realized by only one instruction, as shown in FIG. 39. Therefore, a data translation instruction can be executed far easier at higher speed, as compared with the conventional example in which generation number operation instruction is not used. Further, such a complicated flow graph as shown in FIG. 7 is not necessary, and therefore program development is facilitated.

Though only an instruction rpx for translating the pixel number has been described above, an instruction rln for translating a line number may be used in the same manner. In that case, an address for accessing the generation number translation table is generated, utilizing the line number field of the generation number field of the input packet. For example, the line number is set at lower 10 bits of the address, and lower 5 bits of the right data are set as the higher 5 bits, so that an address for accessing the generation number translation table is generated.

Here, allocation of generation number field changes dependent on the value of the VMS, as already described. Assume that the allocation is as shown in FIG. 37. Then, when the generation number of the input packet is (FFFFFF)H and right input data of rln instruction is (AAA) H, then the generated address would be (57FF)H when the value of the VMS signal is 2, and (2BFF)H when the value is 0. When the value of the VMS signal is 0 and the data read from the address (2BFF)H is (000)H, then 10 bits of (000)H are set at the line number field (5th to 14th bits) of the generation number of the output data packet. More specifically, the output data packet has the generation number of (F003FF)H.

When the value of the VMS signal is 2 and the read data is (000)H, the lower 11 bits of (000)H are set from the 3rd to 13th bits of the generation number. Therefore, the output data packet has the generation number of (C007FF)H.

As described above, by using the data driven type information processing apparatus in accordance with this embodiment, generation number translation can be carried out easily. However, the effect of the data driven type information processing apparatus of the present invention is not limited to this. In the data driven type information processing apparatus of the present invention, general coordinate translation operation such as enlargement, reduction, or rotation of the image can be performed easily at high speed with far higher precision than the conventional method. Such features of the data driven type information processing apparatus of the present invention will be described in the following.

The process for rotation of a certain point of an image by the present invention will be described. For the rotation, two instructions, that is, rgnt instruction and rpl instruction are prepared, for example. Rotation can be carried out by either of these instructions. The process using the rgnt instruction will be described later, followed by the description of the rpl instruction.

(1) Rgnt Instruction

Figure 42:
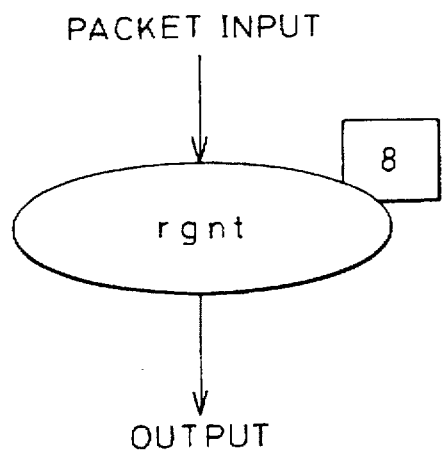
FIG. 42 is a flow graph of an rgnt instruction.

By the rgnt instruction, generation number translation table is referred to, using the generation number (having the length of 24 bits) as the lower address and the right data as the higher address, and the read data is set in the generation number of the data packet. FIG. 42 shows the flow graph of the rgnt instruction. In the example shown in FIG. 42, it is assumed that (8)H is applied as the right data.

Figure 43:
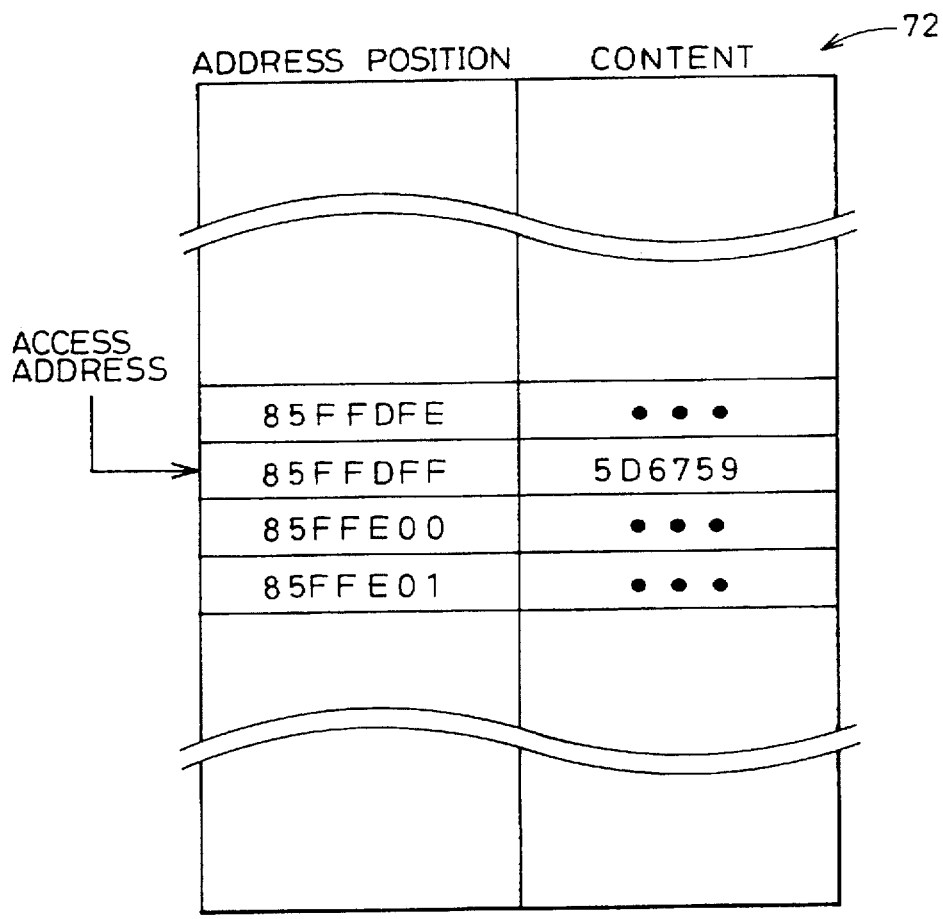
FIG. 43 schematically shows the content of the generation number translation table corresponding to the rgnt instruction.

FIG. 43 shows the content of the generation number translation table 72 for generation number translation using the rgnt instruction. It is assumed that the generation number of the input data packet is (5FFDFF)H, and the left data is (9)H. The right data is (8)H, as mentioned above. From the right data and the generation number, an address (85FFDFF)H is generated. By using (85FFDFF)H as an address, generation number translation table 72 is accessed, whereby the corresponding translated generation number (5D6759)H is read. The read value is set in the generation number of the output data packet.

The generation number after the rotation when prescribed rotation is performed on the generation number is calculated in advance. The calculated value is stored in an address generated from each generation number and the right data, of the generation number translation table 72. Since such a generation number translation table 72 is prepared, rotation for the generation number of the input data packet can be performed only by one instruction.

The content stored in the table may be obtained by rounding the value of actual "division by √2". Compared with the conventional process in which "11/16" is multiplied, precision in calculation is far higher in the present invention. By changing the value of the right data, the address for accessing the generation number translation table may be changed. Therefore, by storing a plurality of different tables in the generation number translation table in advance and by applying a value for designating one of these different tables as right data to rgnt instruction, a plurality of different processes can be realized easily.

By the rgnt instruction, different coordinate translation can be executed image by image.

(2) Rpl Instruction

Figure 44:
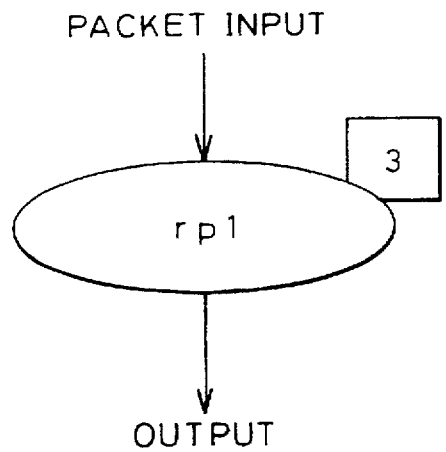
FIG. 44 is a flow graph of an rpl instruction.

Generally, the rpl instruction is the same as the rgnt instruction. FIG. 44 shows the flow graph thereof. In the example shown in FIG. 44, (3)H is applied as the right input.

According to the rpl instruction, the generation number translation table is referred to using the line number field and the pixel number field of the generation number as the lower address and the right data as the higher address, and the line number field and the pixel number field have their values rewritten by the read value. In this case also, allocation of the field of the generation number is set by the VMS signal. For example, in the example shown in FIG. 37 in which VMS=0, the line number field and the pixel number field have the length of 20 bits in total.

Assume that the same data packet as described in (1) above is input. Of the generation number, the line number field and the pixel number field have the values of (FFDFF) H. From the right data (3)H and the line number and the pixel number, an address (3FFDFF)H is generated. By using this as an address, data translation table 72 (see FIG. 45) is accessed, and the corresponding value (D6759)H is read. With the read value (D6759)H set in the line number field and the pixel number field, the generation number of the output data packet would be (5D6759)H.

By using the rpl instruction of (2), the same coordinate translation can be performed on every pixel at the same position of every field.

Figure 45:
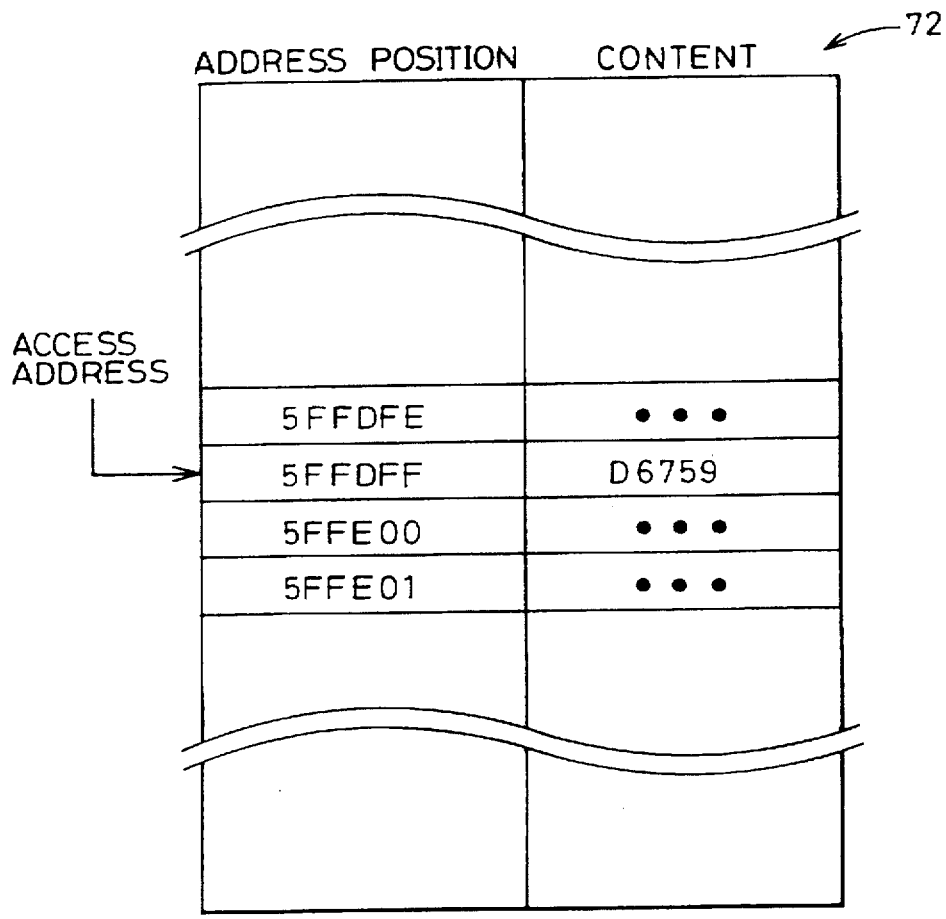
FIG. 45 is a schematic diagram showing the content of generation number translation table with respect to the rpl instruction.

Referring to FIGS. 44 and 45, assume that the instruction code of the input packet is "rpl" (0B7)H, generation number is (5FFDFF)H, left data is (9)H, right data is (3)H and VMS signal is 0. The process for operating the packet in this example will be described. In the following, processes at respective portions at the function portion of FIG. 34 will be described in order.

[Generation Number Address Generating Portion 80]

In generation number address generating portion 80, since instruction information OPC is (0B7)H representing the rpl instruction and VMS signal is 0, the line number field and the pixel number field of the generation number field are extracted. More specifically, generation number address generation portion 80 extracts lower 20 bits (FFDFF)H of the generation number field. Further, generation number address generation portion 80 generates an address (3FFDFF)H using the right data (3)H as the higher bit and (FFDFF)H mentioned above as lower bits, and provides the address to multiplexer 84.

[Data Address Generating Portion 82]

Since instruction information OPC is (0B7)H, data address generating portion 82 applies 0 to multiplexer 84.

[Multiplexer 84]

Multiplexer 84 receives (3FFDFF)H from generation number address generating portion 80 and (0)H from data address generating portion 82, respectively. In response to the instruction information OPC being (0B7)H, multiplexer 84 selects the output (3FFDFF)H from generation number address generating portion 80, and applies the same to table access circuit 86.

[Table Access Circuits 86 and 88]

Table access circuits 86 and 88 read (D6759)H from the address (5FFDFF)H of the data translation table 72 shown in FIG. 45, and applies the read value to multiplexers 90 and 94.

[Generation Number Extracting Portion 92]

Since instruction information OPC is (0B7)H and the VMS signal is 0, generation number extracting portion 92 extracts only (FFDFF)H of the line number field and the pixel number field (lower 20 bits) of the generation number field, and applies these to multiplexer 94. In the present description, the field to be extracted from the generation number is the same in generation number address generating portion 80 and in generation number extracting portion 92. However, a portion of the generation number may be extracted from mutually different fields, by the instruction information OPC.

[Multiplexer 94]

As the instruction information OPC is (0B7)H, multiplexer 94 selects the output (D6759)H of table access circuit 88, and applies the same to generation number setting portion 96.

[Generation Number Setting Portion 96]

To the generation number setting portion 96, the generation number (5FFDFF)H of the input packet provided from generation number address generating portion 80 and the output (D6759)H from multiplexer 94 are applied. Since instruction information OPC is (0B7)H and the VMS signal is 0, the generation number setting portion 96 replaces the lower 20 bits field of (5FFDFF)H of the generation number of the input packet, by (D6759)H applied from multiplexer 94. Therefore, the output data packet has the generation number of (5D6759)H.

By the data driven type information processing apparatus of the present invention, a data flow program can be developed easily even for complicated image processing such as enlargement, reduction and rotation, which are difficult to be executed by using simple arithmetic operations. Further, such complicated process can be executed by only one instruction, so that image processing can be performed at high speed, allowing real time processing. Especially for standardized image translation in which magnification or angle of rotation is fixed, such translation can be realized only by one instruction, and therefore image processing can be performed with higher efficiency.

As described above, by the data driven type information processing apparatus of the present invention, by applying a data packet including a generation number translation instruction, at least a part of the generation number can be rewritten by the corresponding translated generation number in the generation number translation table. Since the generation number can be translated easily with fewer number of instructions and the translated generation numbers can be prepared with desired precision, the precision in translation can be set to a desired level.

Further, by a simple process of generating an address for accessing the generation number translation table based on at least a part of the content of the applied data packet, the generation number can be translated in a desired manner. As a result, generation number can be translated easily at high speed with high precision in accordance with a desired manner. Further, it is possible to change and set the allocation of the generation number field for generating the address, in accordance with a plurality of different methods. Accordingly, addresses can be generated from different partial fields of the generation number field. The generation number field to be rewritten can be changed by the generation number field allocation setting signal. Dependent on the instruction information included in the data packet, either generation number translation or data translation may be selectively performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing apparatus comprising:

a generation number translation table for storing a plurality of translated generation numbers, calculated in advance in association with a generation number in accordance with a prescribed functional relation, at addresses specified as a result of a prescribed calculation on the generation number; and generation number translating means, responsive to an instruction information stored in an applied data packet being a generation number translation instruction, for accessing said generation number translation table based on a content of a generation number field of the applied data packet, for reading a corresponding translated generation number, and for rewriting a generation number in the original generation number field of the applied data packet with the newly read translated generation number.

2. The data driven type information processing apparatus according to claim 1, wherein said generation number translating means comprises:

address generating means, responsive to the instruction information stored in the applied data packet being the generation number translation instruction, for generating an address of said generation number translation table in accordance with the prescribed calculation based on a content of the applied data packet;

table access means for accessing said generation number translation table using the generated address from said address generating means as an address and reading the corresponding translated generation number; and rewriting means for rewriting a part of the original generation number field of the applied data packet with an output from said table access means, in accordance with the instruction information stored in the applied data packet.

3. The data driven type information processing apparatus according to claim 2, further comprising:

means for inputting a generation number field allocation setting signal for specifying, when the generation number field is divided into a plurality of partial fields, field length to be allocated to each of the partial fields, said address generating means generating an address, based on a content of a partial field determined by the instruction information included in the applied data packet, of said plurality of partial fields specified by said generation number field allocation setting signal.

4. The data driven type information processing apparatus according to claim 3, wherein said rewriting means rewrites the content of the partial field determined by the instruction information of the plurality of partial fields, by using the output from said table access means.

5. The data driven type information processing apparatus according to claim 3, wherein said address generating means generates an address by concatenating a content of a data field of the applied data packet and a content of the partial field determined by the instruction information included in the applied data packet.

6. The data driven type information processing apparatus according to claim 2, further comprising:

means for inputting a generation number field allocation setting signal for specifying, when the original generation number field is divided into a plurality of partial fields, field length to be allocated to each of the partial fields, said rewriting means rewriting a content of a partial field determined by the instruction information included in the applied data packet of the plurality of partial fields specified by the generation number field allocation setting signal, with an output from said table access means.

7. The data driven type information processing apparatus according to claim 1, further comprising:

a data translation table to which addresses different from said generation number translation table are allocated, in which a plurality of translated data prepared in advance in association with a content of a data field of the applied data packet in a prescribed relation are stored at an address specified by translation, in accordance with a prescribed method, of the content of the data field of the applied data packet, said generation number translating means including first address generating means, responsive to the instruction information stored in the applied data packet being the generation number translation instruction, for generating an address of said generation number translation table in accordance with the prescribed calculation based on a content of the applied data packet;

second address generating means, responsive to the instruction information stored in the applied data packet being a data translation instruction, for generating an address of said data translation table based on the content of the data field of the applied data packet;

table access means for accessing, in accordance with the instruction information stored in the applied data packet, said generation number translation table or said data translation table, using the generated address from said first address generating means or the generated address from said second address generating means as an address, for reading the corresponding translated data; and rewriting means for rewriting, when the instruction information stored in the applied data packet is a generation number translation instruction, the generation number of the applied data packet with an output from said table access means, and when the instruction information stored in the applied data packet is a data translation instruction, a part of the data field of the applied data packet with the output from said table access means.

8. The data driven type information processing apparatus according to claim 7, further comprising:

means for inputting a generation number field allocation setting signal for specifying, when the original generation number field is divided into a plurality of partial fields, field length to be allocated to each of the partial fields, said first address generating means generating an address, based on a content of a partial field specified by the instruction information included in the applied data packet, of said plurality of partial fields specified by said generation number field allocation setting signal.

9. The data driven type information processing apparatus according to claim 8, wherein said rewriting means rewrites, when the instruction information stored in the applied data packet is a generation number translation instruction, the content of the partial field determined by the generation number translation instruction of the plurality of partial fields by using an output from said table access means.

10. The data driven type information processing apparatus according to claim 8, wherein said first address generating means generates an address by concatenating part of the content of the data field of the applied data packet and the content of the partial field determined by the instruction information included in the applied data packet.

11. The data driven type information processing apparatus according to claim 7, further comprising:

means for inputting a generation number field allocation setting signal for specifying, when the original generation number field is divided into a plurality of partial fields, field length to be allocated to each of the partial fields, said rewriting means rewriting the content of the field determined by the generation number translation instruction of the plurality of partial fields specified by the generation number field allocation setting signal of the original generation number field, by using an output from said table access means, when the instruction information stored in the applied data packet is the generation number translation instruction.

12. A method of data driven type information processing comprising the steps of:

a) storing a plurality of translated generation numbers, calculated in advance in association with a generation number in accordance with a prescribed functional relation, at addresses in a generation number translation table specified as a result of a prescribed calculation on the generation number;

b) accessing the generation number translation table, responsive to an instruction information stored in an applied data packet being a generation number translation instruction, based on a content of a generation number field of the applied data packet;

c) reading a corresponding translated generation number; and d) rewriting a generation number in the original generation number field of the applied data packet with the newly read translated generation number.

13. The method of data driven type information processing of claim 12, wherein said step b) comprises:

b1) generating an address of the generation number translation table, responsive to the instruction information stored in the applied data packet being the generation translation instruction, in accordance with the prescribed calculation based on a content of the applied data packet; and b2) accessing the generation number translation table using the generated address of said step b1) as an address.

14. The method of data driven type information processing of claim 13, further comprising:

e) inputting a generation number field allocation setting signal for specifying, when the original generation number field is divided into a plurality of partial fields, field length to be allocated to each of the partial fields, the address being generated in said step b1) based on a content of a partial field determined by the instruction information included in the applied data packet.

15. The method of data driven type information processing of claim 14, wherein said step d comprises rewriting the content of the partial field determined by the instruction information of the plurality of partial fields using the newly read translated generation number.

16. The method of data driven type information processing of claim 14, wherein the address is generated in said step b1) by concatenating a content of a data field of the applied data packet and a content of the partial field determined by the instruction information included in the applied data packet.

17. The method of data driven type information processing of claim 13, further comprising:

e) inputting a generation number field allocation setting signal for specifying, when the original generation number field is divided into a plurality of partial fields, field length to be allocated to each of the partial fields, said step d) comprising rewriting a content of a partial field determined by the instruction information included in the applied data packet of the plurality of partial fields specified by the generation number field allocation setting signal, with the newly read translated generation number.

18. A data driven type information processing apparatus comprising:

a memory for storing a plurality of translated generation numbers, the plurality of translated generation numbers each being provided in accordance with a respective predetermined transformation of corresponding original generation numbers and each being stored at addresses within said memory determined to have a predetermined relation to the corresponding translated generation numbers; and generation number translating means for reading a translated generation number from said memory in accordance with a generation number field of an applied data packet and rewriting a generation number in the original generation number field of the applied data packet based on the newly read translated generation number.

19. The data driven type information processing apparatus of claim 18, wherein said generation number translating means accesses said memory for reading responsive to an instruction information stored in the applied data packet being a generation number translation instruction.

20. The data driven type information processing apparatus of claim 19, wherein the original generation number field has a plurality of partial fields, the data driven type information processing apparatus further comprising:

input means for specifying a field length to be allocated to each of the plurality of partial fields of the original generation number field, said generation number translating means determining an address of said memory to access in accordance with data within the plurality of partial fields and the instruction information of the applied data packet.

* * * * *